United States Patent [19]
Nohtomi et al.

[11] 3,880,974
[45] Apr. 29, 1975

[54] PROCESS FOR BIAXIALLY PRODUCING ORIENTED TUBULAR POLYETHYLENE TEREPHTHALATE FILMS BY SIMULTANEOUS STRETCHING

[75] Inventors: Ryohta Nohtomi; Tuyoshi Shigeyoshi; Masayoshi Sugiyama, all of Fuji, Shizuoka, Japan

[73] Assignee: Kohjin Co., Ltd., Tokyo, Japan

[22] Filed: Aug. 8, 1973

[21] Appl. No.: 386,821

[30] Foreign Application Priority Data
May 17, 1973 Japan.............................. 48-54144

[52] U.S. Cl................ 264/95; 264/210 R; 264/237; 264/290 R
[51] Int. Cl.......................... B29d 7/24; B29d 23/04
[58] Field of Search........ 264/95, 89, 210 R, 290 R, 264/290 T, 237, 209, 289

[56] References Cited
UNITED STATES PATENTS

| | | | |
|---|---|---|---|
| 2,578,899 | 12/1951 | Pace, Jr. | 264/290 |
| 3,231,642 | 1/1966 | Goldman | 264/95 |
| 3,325,575 | 6/1967 | Last | 264/95 |

*Primary Examiner*—Jeffery R. Thurlow
*Attorney, Agent, or Firm*—Sughrue, Rothwell, Mion, Zinn & MacPeak

[57] ABSTRACT

An improved simultaneous biaxial stretching process for polyethylene terephthalate is provided by observing the following factors: the nonstretched film has a crystallinity of below 18%; the length of the stretching zone is 1 to 1.5 times the maximum expansion diameter; the film in the initial one-third of the stretching zone is kept at 83° – 108°C; and the temperature is smoothly and continuously lowered over the remaining two-thirds of the stretching zone so the film temperature at the stretching end point is at 70° – 78°C.

4 Claims, 1 Drawing Figure

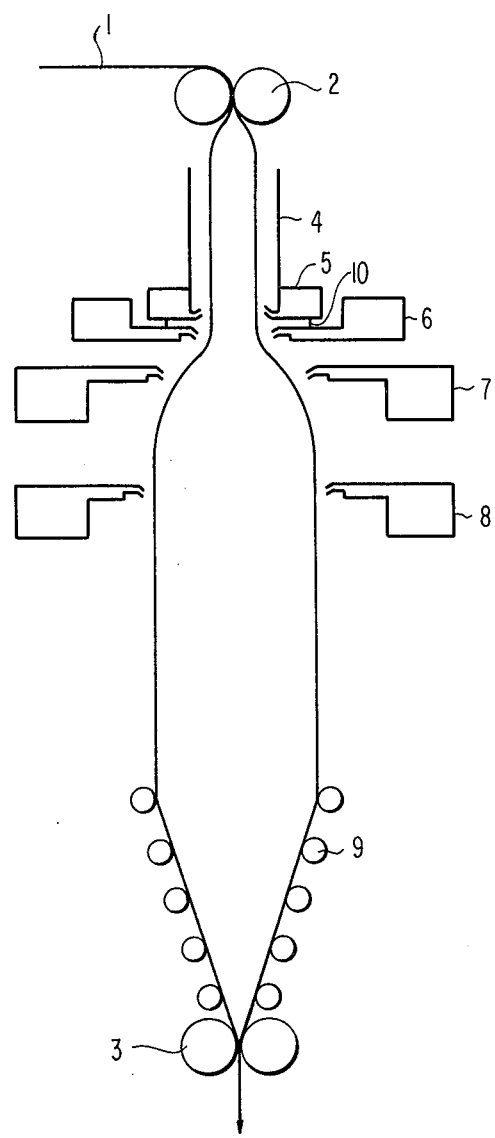

PROCESS FOR BIAXIALLY PRODUCING ORIENTED TUBULAR POLYETHYLENE TEREPHTHALATE FILMS BY SIMULTANEOUS STRETCHING

BACKGROUND OF THE INVENTION

1. Field of the Invention

The present invention relates to a process for industrially producing biaxially oriented polyester films in an advantageous manner from a polyethylene terephthalate resin by a tubular process.

2. Description of the Prior Art

Hitherto, many processes have been known for producing biaxially oriented polyester films. Most of are two stage stretching processes using tenters. As tubing processes, many devices are used. However, useful conditions of expansion and stretching of a nonstretched film for industrially simultaneous biaxially stretching tubular films are not known.

SUMMARY OF THE INVENTION

One object of the present invention is to provide a process for industrially producing simultaneously biaxially-stretched film from polyethylene terephthalate by a tubing process.

Usually, simultaneous biaxial stretching by a tubular process comprises introducing a nonstretched film between two speed controlling devices which are driven at a low speed and a high speed, respectively, heating the film to a temperature suitable for stretching and expanding by applying gas pressure inside of the tubular film, cooling and removing from the speed controlling device driven at high speed. There are some indispensable conditions which must be met to satisfactorily carry out this expansion stretching process. The most important are: firstly, to make the frequency of puncture of the tubular film during the expansion stretching step low; secondly, to make the swaying of the bubble during expansion stretching low; and, thirdly, to adjust the properties of the resulting film such as transparency, strength, dimensional stability, Young's modulus and slippability, etc., to fit the end use.

The puncture of the film bubble should be prevented because it directly lowers the production efficiency and has a great influence upon the quality of the product. The swaying of the film bubble should be prevented because it not only disturbs the thickness, uniformity and flatness of the product but also leads to an increase of the frequency of punctures. Of course, the quality of the film product should be kept high to meet commercial requirements.

As a result of many experiments to satisfy the above indispensable factors, it was found that the crystallinity of the nonstretched film, the length of the stretching zone at expansion stretching process and the temperature gradient in the stretching zone are the basic factors which control successful stretching.

The present invention thus relates to a simultaneous biaxial stretching process which comprises extruding molten polyethylene terephthalate from an annular die, introducing the cooled, tubular, nonstretched resin film between two pairs of speed controlling devices which have different circumferential speeds, and expanding by applying gas pressure to the interior of the tubular film while heating, by which the tubular film is simultaneously biaxially stretched, the process being characterized by the following features: nonstretched film having a degree of crystallinity, is used, the length of the stretching zone from the starting point of stretching the film to the end point thereof (maximum expansion point) is kept in the range of 1 - 1.5 times the maximum expansion film diameter, the film temperature in the initial one-third of the stretching zone is kept at 83° - 108°C (according to the crystallinity of the non-stretched film), the temperature is continuously decreased over the remaining two-thirds of the zone and the film temperature at the stretching end point is kept at 70° - 78°C regardless of the crystallinity of the nonstretched film.

BRIEF DESCRIPTION OF THE DRAWING

The drawing is a sectional plan of an embodiment of the present invention where the numerals show:
1. Non-stretched film;
2. Low speed nip rolls;
3. High speed nip rolls;
4. Pre-heating cylinder;
5. Pre-heating air ring;
6. Main heating air ring;
7. Sub-heating air ring;
8. Cooling air ring;
9. Folding-up rolls; and
10. Shelter plate

DETAILED DESCRIPTION OF THE INVENTION

Hitherto, it has been said that it is preferred to use nonstretching films having a crystallinity as low as possible, that is, so that substantial crystallization hardly occurs in a two-stage biaxial stretching process using tenters. However, according to the simultaneous biaxial stretching process of the present invention, it is possible to carry out satisfactory stretching even if the film somewhat crystallized, and, in some cases, rather good results can be provided from such crystallized nonstretched films from the viewpoint of stiffness and the slipping property of the film products. However, it is not preferred to use nonstretched films which are crystallized to a degree exceeding the crystallinity limit, because the stretching of the film at biaxial stretching becomes non-uniform, the frequency of puncture of the film bubble increases and the transparency of the film product deteriorates. As a result of detailed studies of these problems, it become clear that the necessary requirements are satisfied if the crystallinity is below 18%, as shown in Table 1. In producing a tubular nonstretched film, it is difficult to obtain a film having a crystallinity of lower than 2% by conventional quenching. While it is possible to obtain one having a crystallinity of lower than 2% by special quenching procedures such is inconvenient on an industrial scale.

Herein, the crystallinity of the film is determined by the measurement of density using a density gradient column, and then calculating the crystallinity proportionate to the measured density on the basis of the density of a completely amorphous substance being 1.335 and that of a completely crystallized substance being 1.455.

Polyethylene terephthalate film is very difficult to crystallize to a degree above 45%, even if it is biaxially stretched and then crystallized by a heat treatment. Therefore, a crystallinity of 18% of the nonstretched film means a fair degree of crystallization, which is very different from the case of the two-stage biaxial stretching process which requires a non-stretched films which is not substantially crystallized. It is preferred that the crystallinity of the film in the present invention be from 3% to 18%. Most preferred of the polyethylene terephthalate materials used in the present invention are those which have an intrinsic viscosity [η] of from 0.55 to 1.10. However, it shall be understood that this range is merely preferred, and not limitative.

In order to stretch the non-stretched film which has some degree of crystallinity, it is necessary to raise the heating temperature, because the optimum stretching temperature is higher than that for a film having a low crystallinity, as shown in Table 1. It is not difficult to carry out smooth stretching if the length of the stretching zone at expansion stretching is suitably selected as in accordance with the present invention. Herein, the stretching zone means the section between the starting point of stretching the tubular film (equal to the expansion beginning point) and the end point of stretching (the expansion end point, namely, the point at which the maximum expanded diameter is reached). The length of the stretching zone is the distance of this section measured in the machine direction of the tubular film. If the length of the stretching zone is short, the film bubble becomes conical in shape and is rapidly stretched in the transverse direction over a short run, which causes violent swaying of the film bubble, and consequently not only is the uniformity of film thickness and the flatness of the film deteriorated but the frequency of puncture increases. On the contrary, if the length of the stretching zone is too long, the same disadvantages as when the stretching zone is short occur since the shape of the film bubble is difficult to maintain because the heating zone, namely, the section in which the film is in the softened state, is too long, and consequently violent swaying occurs. As the result of detailed studies, it was found that it is impossible to keep satisfactory stretching if the length of the stretching zone is not in the range of 1 – 1.5 times of the maximum expanded diameter, regardless of a stretching ratio and width of the stretched film, as shown in Table 2.

On the other hand, it is difficult to achieve satisfactory stretching if the temperature gradient of the film is not suitable in the stretching zone, even if the crystallinity of the non-stretched film and the length of the stretching zone are kept in the above limitative ranges. Polyethylene terephthalate has the property that it remarkably crystallizes upon heating and orientating in the stretching zone. This is because it is a crystalline, high molecular substance and a non-stretched film having a controlled crystallinity is used as a starting material for the biaxial stretching. In the prior art when a two-stage biaxial stretching process is used, the film is stretched with heat in one direction to cause a monoaxial orientation. The oriented film which is fairly crystallized is then heated to a temperature higher than the stretching temperature of the first stage and stretched in the second direction (which is at right angles to the first direction). Accordingly, the film is subjected to applications of nearly uniform temperatures, though there is a difference between the temperature of the first stage and that of the second stage.

However, in the case of the simultaneous biaxial stretching of the present invention, since stretching in the machine direction and in the transverse direction are simultaneously carried out, the degree of orientation and crystallinity rapidly increase in the initial period of stretching with the progress of the stretching, while the apparent softening point of the film increases and the thickness of the film rapidly lowers. Accordingly, it is necessary to smoothly and continuously change the stretching tension in order to smoothly carry out stretching at each part of the stretching zone.

The stretching tension σ, of course, depends upon the relationship represented by the following formula wherein P is the gas pressure inside of the film bubble, t is the thickness of the film and D is the diameter of the film:

$$\sigma = \frac{PD}{2t}$$

where
$\sigma$ [Kg/cm$^2$]
$P$ [Kg/cm$^2$]
$D$ [cm]
$t$ [cm].

It is difficult to maintain smooth stretching if the stretching tension σ between the starting point and end point of stretching is not appropriately controlled, and in the stretching zone with higher bubble diameters D gradually increase and lower t rapidly decreases so that the stretching tension σ rapidly varies. The varying of the stretching is dependant not only on the varying of D and t but also on the orientation and crystallization, which are rapidly changed with the progress of the stretching, and further it is dependant on the varying of the film temperature. In order to appropriately maintain the stretching tension gradient caused by such factors, there is no way other than appropriately maintain the film temperature gradient in the stretching zone.

For example, as in the case of two-stage stretching, when the film temperature of the stretching zone is uniform, i.e., there is no temperature gradient, it is not only impossible to control the diameter of the tubular film, that is, the width of the film, but also the swaying of the film bubble becomes sufficiently violent to result in punctures since the film bubble expands above the desired diameter. If the film temperature lowers linearly just after the beginning of stretching, the progress of the expansion is remarkably impeded because of the orientation and crystallization at the beginning of stretching. Consequently, if it is desired to keep the expanded diameter to a definite value, the inner pressure of the film bubble, that is the stretching tension, becomes excessive and causes frequent punctures. Further, if the temperature at the expansion end point is too high, it is not only difficult to control the final diameter because it is impossible to stop expansion, but also the film bubble does not keep its shape and causes swaying because the film at the latter half of the stretching zone is too soft. On the contrary, if the temperature is too low, it is not only impossible to control final diameter because the expansion end point approaches the expansion beginning point, but also the length of the stretching zone is out of the limitative range and consequently swaying and puncture of the film bubble are violently caused. Furthermore, as described already, the optimum temperature gradient changes depending upon the crystallinity of the nonstretched film.

Thus, it is necessary, with a non-stretched film having a high crystallinity, that the temperature near the stretching starting point be higher and the temperature at the stretching end point be nearly equal to or slightly higher than in a non-stretched film having a low crystallinity. In actuality, non-stretched films having a 3% to 18% crystallinity are subjected to simultaneous biaxial stretching at the above mentioned stretching zone limitative range.

The results of experiments on the temperature gradient in the above cases are shown in Table 3. It is clear from Table 3 how the stability of stretching changes in accordance with changes in the temperature gradient and what the optimum temperature gradient of operation is. Namely, it is desirable that the temperature at the stretching starting point and in the initial one-third of the stretching zone does not substantially change and is set at 85° – 113°C, corresponding to the crystallinity of the stretched film. Further, it is necessary that the temperature lower continuously in the latter two-thirds of the stretching zone and the temperature at the stretching end point be in the range of 70° – 78°C regardless of the crystallinity of the non-stretched film. It is to be noted in the present invention that, so long as a common-sense approach is used, the time in the latter two-thirds of the stretching zone does not substantially influence the stretching. An equal temperature gradient is maintained, however, over the latter two-thirds of the stretching zone.

Herein, the temperature of the film is measured by a contact type or non-contact type thermometer. Thus the optimum temperature gradient is in an unexpectedly narrow range, which is, of course, a characteristic of the simultaneous biaxially stretching of the tubular polyethylene terephthalate film in accordance with the present invention.

Balancing all factors, the degree of stretching in the present invention is most preferably maintained within the range of from 2.5 to 4.0 times in both directions, respectively. It will be appreciated by one skilled in the art, however, that some variation is permitted from this range. However, this range was determined as the result of lengthy experimentation by the inventors, and little need will be encountered to practice the present invention outside of this range. A further parameter extensively investigated by the inventors was the maximum expansion diameter, and viewing this factor from the viewpoint of the most important commercial embodiments of the invention, a maximum expansion diameter of 10 cm – 2 m is preferred. However, the length of the stretching zone is a more important factor in the present invention than the absolute dimension of the maximum expansion diameter.

In the following, a process for practising the present invention will be explained with reference to the appended drawing.

The process for producing the non-stretched film, which is not necessary to explain by drawings, comprises extruding molten polyethylene terephthalate resin by means of an annular die and cooling the resulted molten tubular film by sliding it in contact with the surface of an interior water-cooling type cylindrical mandrel, or by directly applying cold water to the outer surface of the film which is sliding on the mandrel so as to accelerate quick cooling.

If cooling water is not applied directly to the outer surface of the film, non-stretched films having a 10 – 25% crystallinity can easily be obtained, while if cooling water is applied directly to the outer surface of the film, non-stretched films having a crystallinity below 10% can easily be also obtained. Further, films having the desired crystallinity can be obtained by controlling the temperature of the cooling water.

The thus produced non-stretched tubular film 1 is guided through low speed nip rolls 2 at the upper end of the stretching apparatus to high speed nip rolls 3 at the lower end thereof. The stretching ratio in the machine direction is controlled by the ratio of the circumferential speed of the low speed nip rolls to that of the high speed nip rolls. The tubular film passing between both nip rolls is pre-heated to 50° – 75°C by a blast of hot gas, e.g., air in a pre-heating cylinder 4. The supply of hot air to the pre-heating cylinder 4 is carried out by a preheating air ring 5. The tubular film from the pre-heating cylinder is further heated by a blast of hot air ejected by a main heating air ring 6, by which expansion begins due to interior gas pressure. The film temperature at the stretching starting point and in the initial one-third of the stretching zone is kept to a nearly definite temperature by controlling location of the main heating air ring 6, the temperature of the hot air blast and the angle of ejection thereof.

In this case, the space between the pre-heating air ring and the main heating air ring are enclosed by a shelter plate 10, by which the hot blast ejected from the main heating ring is not accompanied by exterior cool air, and thus the approximate one-third of the stretching zone is kept at a definite temperature.

The expanding film passed through the initial one-third of the stretching zone is then heated by a hot air ejected from a sub-heating air ring 7 so as to have a definite temperature gradient. Of course, the temperature of the hot air from the sub-heating air ring 7 is adjusted so as to be lower than that of the main heating air ring 6. This hot air is mixed with the hot air which is ejected from the main heating air ring and flows downwards along the film while it is simultaneously mixed with accompanying air having a temperature near room temperature, by which a gentle temperature gradient is provided on the film passing through the latter two-thirds of the stretching zone. At this time, a desired temperature gradient can be obtained by controlling the relative distance between the main heating air ring and the sub-heating air ring, the temperature of each hot blast or speed of ejection, or all three.

The tubular film, the expansion and the stretching of which have been concluded, is cooled by a cold air blast ejected by a cooling air ring 8 placed at the expansion end point, and then the tubular film is folded by collapser rolls 9 and is guided out of the high speed nip rolls 3.

When the diameter of the stretching film bubble is large, it is, of course, necessary to further provide more sub-heating air rings in order to form the desired temperature gradient because the length of the stretching zone should be long. On the contrary, when the diameter of the stretching film bubble is small, it is sometimes possible to obtain the desired temperature gradient only by a combination of the main heating air ring and the cooling ring, without using a sub-heating air ring. Through the temperature gradient can be provided by the above mentioned hot air, it is also possible to provide the same by an infrared heater or a combination of an infrared heater and a hot or cold air.

In the heretofore offered discussion, it is to be noted that the crystallinity was defined in general as being below 18% preferably from 3% to 18%, the length of the stretching zone from the starting point to the end point defined as in the range of 1.0 to 1.5 times the maximum expansion diameter, the film temperature in the initial one-third defined as 83° − 108°C, the film temperature at the stretching end point defined as 70° − 78°C, the intrinsic viscosity [η] defined as 0.55 − 1.10, the degree of stretching defined as 2.5 to 4.0 times in both directions and the maximum expansion diameter defined as 10 cm to 2 m. These are exact values, and they were determined as optimum values as a result of long and lengthy experimentation by the inventors. However, the present specification and the amended claims are to be interpreted as including some variation in these ranges, i.e., each lower and upper limit could have been defined using "about" terminology, and such use is included in the present invention. The exact ranges do define a most highly preferred range of operation, however, and while some leeway is permitted in the bounds of the ranges, optimum operation is encountered with operation involving strict adherence to the ranges, and this is the most highly preferred form of the invention.

In the following, the present invention will be explained in more detail by several examples.

EXAMPLE 1

A non-stretched tubular film having a 66 mm diameter, a 110 μ thickness and of 7% crystallinity was produced by melting a polyethylene terephthalate resin having a 0.7 intrinsic viscosity at 287°C in an extruder, extruding it from an annular die having a slit 75 mm in diameter, sliding down the film on a mandrel having a 66 mm diameter (the interior of which was cooled by water at 20°C provided just under the die) while directly cooling the exterior of the film with cold water of 20°C, and removing the film.

The resultant non-stretched film was simultaneously biaxially stretched using an apparatus shown in the drawing. The circumferential speed of the low speed nip rolls and of the high speed nip rolls were set at 4 m/min and 12 m/min, respectively. The film temperature at the outlet of the preheating cylinder was kept at 66°C by ejecting a hot air at 70°C from the pre-heating air ring. A hot air at 96°C was ejected from the main heating air ring to keep the film temperature at the stretching starting point at 88°C and to keep the film temperature at the initial one-third of the stretching zone at 87° −90°C.

In this case, the stretching starting point was located about 20 mm above the point at which the hot air hit the film. Further, a hot air at 84°C was ejected from the sub-heating air ring which was located 70 mm lower than the main heating air ring, by which the film temperature in the lower two-thirds of the stretching zone decreased with a 85°C to 73°C gradient in a continuous manner. Accordingly, the film temperature at the stretching end point where the expanded diameter was maximum 73°C.

After cooling rapidly by blasting cool air at room temperature from a cooling air ring having a jet nozzle located just under the point at which the expanded diameter became maximum, the film was folded by the fold-up rolls and guided from the collapser rolls (high speed nip rolls). In this case, the diameter of the film bubble at the stretching end point was 200 mm, the stretching ratio was 3 times in both the machine direction and the transverse direction, and the length between the stretching starting point and the end point, namely the length of the stretching zone, was about 240 mm, which corresponded to 1.2 times of the maximum expansion diameter.

During simultaneously biaxial stretching, the shape of the film bubble was definite and swaying was hardly observed. No punctures occurred during the operation for about 7 hours.

The resulting biaxially stretched film was thermally set under tension at 200°C for 30 seconds to obtain a film having a 19 μ thickness (if desired, the thermal setting techniques of Japanese Patent Publication No. 5639/1955 can be applied following the processing of the present invention). The haze was good, that is 1.9. The tensile strength was very high, that is MD: 1.920 Kg/cm$^2$ and TD: 1.780 Kg/cm$^2$, and the ratio of MD/TD was near 1, which showed that the orientation was well balanced.

EXAMPLE 2

A non-stretched tubular film having a 66 mm diameter, a 117 μ thickness and of 18% crystallinity was produced by melting a polyethylene terephthalate resin having a 0.7 intrinsic viscosity at 287°C by an extruder, extruding it from an annular die having a slit of 75 mm diameter, cooling the inside of the film directly by water by sliding it on a mandrel having a 66 mm diameter, the interior of which was cooled by water at 30°C, provided just under the die, while the exterior of the film was cooled by jetting a high speed cold air thereon from the outer circumference of the mandrel part, and removing the film.

The resulting non-stretched film was simultaneously biaxially stretched using an apparatus as shown in the drawing. The circumferential speed of the low speed nip rolls and of the high speed nip rolls were set to 3.5 m/min and 10.5 m/min, respectively. The film temperature at the outlet of the preheating cylinder was kept at 70°C by ejecting a hot air at 75°C from the pre-heating air ring thereagainst. A hot air at 120°C was ejected from the main heating air ring to keep the film temperature at the stretching starting point at 107°C and to keep the film temperature at the initial one-third of the stretch zone in the range of 105° — 108°C. In this case, the stretching starting point was located about 25 mm above the point at which the hot air hit the film. Further, a hot air of 103°C was ejected from a sub-heating air ring which was located 65 mm lower than the main heating air ring, by which the film temperature in the lower two-thirds of the stretching zone continuously decreased over a 104°C to 75°C temperature gradient. The film temperature of the stretching end point was thus 75°C. The film was then cooled in the same manner as in Example 1.

In this case the diameter of the film bubble, that is, the maximum expansion diameter, was 200 mm, the stretching ratio was 3 times in both the machine direction and transverse direction, and the length of the stretching zone was about 240 mm, which corresponds to a 1.2 times maximum expansion diameter.

During the simultaneous biaxial stretching, the shape of the film bubble was definite and swaying was hardly observed. No punctures occurred during film production for about 5 hours. The resulting biaxially oriented film was thermally set under tension at 200°C for 30 seconds to obtain a film having a 20 μ thickness. Haze was good, that is 2.1. The tensile strength was very high, that is MD: 2230 Kg/cm² and TD: 1970 Kg/cm², and the ratio of MD/TD was near 1, which showed that the orientation was well balanced.

Table 1

| Condition | Crystallinity of non-stretched film (%) | Ratio of length of stretching zone to the maximum expansion diameter | Film temperature at stretching starting point (°C) | Film temperature at initial ⅓ of stretching zone (°C) |
|---|---|---|---|---|
| $A_1$ | 4.3 | 1.1 | 80 | 79 ~ 82 |
| $A_2$ | 4.3 | 1.2 | 83 | 82 ~ 85 |
| $A_3$ | 4.3 | 1.1 | 87 | 87 ~ 89 |
| $B_1$ | 12.7 | 1.1 | 83 | 82 ~ 84 |
| $B_2$ | 12.7 | 1.2 | 88 | 86 ~ 89 |
| $B_3$ | 12.7 | 1.2 | 93 | 92 ~ 95 |
| $C_1$ | 17.8 | 1.2 | 92 | 92 ~ 94 |
| $C_2$ | 17.8 | 1.3 | 105 | 104 ~ 107 |
| $C_3$ | 17.8 | 1.3 | 109 | 108 ~ 110 |
| $D_1$ | 22.6 | 1.1 | 105 | — |
| $D_2$ | 22.6 | 1.3 | 112 | — |
| $D_3$ | 22.6 | 1.3 | 118 | — |

Note: The ratio of stretching was 3.0 times in the machine direction and 3.0 times in the transverse direction.

| Film temperature at stretching end point (°C) | Amplitude of swaying of stretched bubble | Frequency of puncture of bubble | Haze of stretched film (%) | Tensile strength of stretched film (Kg/cm²) MD | TD |
|---|---|---|---|---|---|
| 74 | Narrow | Fairly high | 1.6 | 1.930 | 1.870 |
| 70 | Narrow | Nearly none | 1.8 | 1.780 | 1.720 |
| 72 | Fairly wide | Low | 2.4 | 1.710 | 1.630 |
| 75 | Narrow | Fairly high | 1.7 | 2.230 | 1.990 |
| 73 | Narrow | Nearly none | 2.0 | 1.980 | 1.910 |
| 73 | Fairly wide | Low | 2.9 | 1.920 | 1.860 |
| 74 | Narrow | Fairly high | 1.8 | 2.350 | 2.200 |
| 78 | Narrow | Nearly none | 2.1 | 2.270 | 2.110 |
| 76 | Wide | Fairly high | 3.3 | 2.020 | 1.940 |
| — | Fairly wide | Very high | — | — | — |
| — | Wide | Very high | — | — | — |
| — | Wide | Very high | — | — | — |

Table 2

| Condition | Ratio of length of stretching zone to maximum expansion diameter | Crystallinity of non-stretched film (%) | Film temperature at stretching starting point (°C) |
|---|---|---|---|
| $E_1$ | 0.8 | 7.3 | 85 |
| $E_2$ | 1.0 | 7.3 | 85 |
| $E_3$ | 1.4 | 7.3 | 85 |
| $E_4$ | 1.7 | 7.3 | 85 |
| $F_1$ | 0.9 | 15.4 | 101 |
| $F_2$ | 1.2 | 15.4 | 102 |
| $F_3$ | 1.5 | 15.4 | 102 |
| $F_4$ | 1.7 | 15.4 | 102 |

| Film temperature at initial ⅓ of stretching zone (°C) | Film temperature at stretching end point (°C) | Amplitude of swaying of stretched bubble | Frequency of puncture of bubble | Note |
|---|---|---|---|---|
| 84 ~ 86 | 73 | Wide | Very high | +++ |
| 84 ~ 86 | 71 | Narrow | Nearly none | — |
| 83 ~ 86 | 70 | Narrow | Nearly none | — |
| 81 ~ 86 | 73 | Wide | Fairly high | + |
| 100 ~ 102 | 74 | Wide | Very high | +++ |
| 99 ~ 102 | 72 | Narrow | Nearly none | — |
| 98 ~ 103 | 73 | Narrow | Low | — |
| 96 ~ 103 | 73 | Wide | High | + |

Table 3

| Condition | Film temperature at initial ⅓ of stretching zone (°C) | Film temperature at latter ⅔'s of stretching zone (°C) | Film temperature at stretching starting point (°C) | Film temperature at stretching end point (°C) |
|---|---|---|---|---|
| $G_1$ | 85 → 79 | 78 → 71 | 85 | 71 |
| $G_2$ | 84 – 86 | 83 → 71 | 85 | 71 |
| $G_3$ | 84 – 86 | 83 → 75 | 86 | 75 |
| $G_4$ | 84 – 86 | 83 → 79 | 85 | 79 |
| $G_5$ | 85 – 86 | 86 → 82 | 86 | 82 |
| $H_1$ | 89 → 80 | 79 → 73 | 89 | 73 |
| $H_2$ | 89 → 83 | 82 → 74 | 89 | 74 |
| $H_3$ | 88 – 90 | 87 → 72 | 90 | 72 |
| $H_4$ | 89 – 91 | 89 → 77 | 89 | 77 |

Table 3 — Continued

| Condition | Film temperature at initial ⅓ of stretching zone (°C) | Film temperature at latter ⅔'s of stretching zone (°C) | Film temperature at stretching starting point (°C) | Film temperature at stretching end point (°C) |
|---|---|---|---|---|
| $H_5$ | 89–91 | 89 → 81 | 89 | 81 |
| $I_1$ | 105 → 94 | 94 → 76 | 105 | 73 |
| $I_2$ | 105–107 | 104 → 74 | 106 | 74 |
| $I_3$ | 105–108 | 104 → 85 | 107 | 85 |
| $I_4$ | 109–113 | 107 → 76 | 110 | 76 |
| $I_5$ | 112–116 | 111 → 77 | 114 | 75 |

Note: → means continuous decrease of temperature.
– means a temperature range.

| Ratio of length of stretching zone to maximum expansion diameter | Amplitude of swaying of stretched bubble | Frequency of puncture of bubble | Note |
|---|---|---|---|
| 1.3 | Narrow | Fairly high | Inner pressure of bubble so high that bubble easily punctured. |
| 1.2 | Narrow | Nearly none | |
| 1.3 | Narrow | Nearly none | |
| 1.5 | Comparatively wide | Fairly high | Difficult to keep stretching zone in the optimum hange. |
| Above 1.5 | Wide | High | " |
| 1.4 | Narrow | High | Inner pressure of bubble so high that bubble easily punctured. |
| 1.3 | Narrow | Fairly high | |
| 1.2 | Narrow | Nearly none | |
| 1.3 | Narrow | Nearly none | |
| Above 1.5 | Wide | High | Difficult to keep stretching zone in optimum range. |
| 1.3 | Fairly wide | High | Inner pressure of bubble so high that bubble easily punctured. |
| 1.2 | Narrow | Low | |
| Above 1.5 | Wide | High | Difficult to keep stretching zone in optimum range. |
| 1.3 | Comparatively wide | Fairly high | |
| 1.3 | Wide | Very high | |

While the invention has been described in detail and with reference to specific embodiments thereof, it will be apparent to one skilled in the art that various changes and modifications can be made therein without departing from the spirit and scope thereof.

What is claimed is:

1. A process for producing simultaneously biaxially oriented tubular polyethylene terephthalate films by simultaneous stretching which comprises extruding a molten polyethylene terephthalate resin from an annular die, introducing the cooled tubular non-stretched film between two pairs of speed controlling devices which have a different circumferential speed, and expanding in a stretching zone by applying gas pressure inside the tubular film while heating, by which the tubular film is simultaneously biaxially stretched 2.5 to 4.0 times in both directions, wherein said process is characterized by: the crystallinity of the non-stretched film is 3% to 18%; the length of the stretching zone from the starting point for stretching the film to the end point of stretching thereof is kept in the range of 1.0–1.5 times of the maximum expansion diameter of the stretched film; the film temperature at the initial one-third of the stretching zone is kept at 83°–108°C; the film temperature is continuously decreased in the remaining two-thirds of said stretching zone; and the film temperature at the stretching end point is kept at 70°–78°C.

2. A process as claimed in claim 1 wherein the intrinsic viscosity of said polyethylene terephthalate $[\eta]$ is from 0.55 to 1.10.

3. A process as claimed in claim 2 wherein said maximum expansion diameter is from 10 cm to 2 m.

4. A process as claimed in claim 1 wherein the stretching tension is smoothly and continuously changed during the stretching, the stretching tension $\sigma$ being defined by the formula:

$$\sigma = \frac{PD}{2t}$$

wherein $\sigma$ is in Kg/cm², $P$ is the gas pressure inside of the film bubble in Kg/cm², $t$ is the thickness of the film in cm and $D$ is the diameter of the film in cm.

* * * * *